(12) United States Patent
Kim et al.

(10) Patent No.: US 9,524,040 B2
(45) Date of Patent: Dec. 20, 2016

(54) IMAGE EDITING APPARATUS AND METHOD FOR SELECTING AREA OF INTEREST

(71) Applicant: Samsung Electronics Co., Ltd., Gyeonggi-do (KR)

(72) Inventors: Do-Hyeon Kim, Gyeonggi-do (KR); Dong-Chang Lee, Daegu (KR); Dong-Hyuk Lee, Seoul (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 421 days.

(21) Appl. No.: 13/789,043

(22) Filed: Mar. 7, 2013

(65) Prior Publication Data

US 2013/0234964 A1  Sep. 12, 2013

(30) Foreign Application Priority Data

Mar. 8, 2012 (KR) .................. 10-2012-0023909

(51) Int. Cl.
*G06F 3/041* (2006.01)
*G06F 3/0488* (2013.01)
*G06F 3/0484* (2013.01)
*G06T 11/60* (2006.01)

(52) U.S. Cl.
CPC .............. *G06F 3/041* (2013.01); *G06F 3/0488* (2013.01); *G06F 3/04845* (2013.01); *G06T 11/60* (2013.01)

(58) Field of Classification Search
CPC ...... G06T 11/20; G06T 11/60; G06F 3/04886; G06F 3/0484; G06F 3/04842; G06F 3/04845; G06F 3/04847; G06F 3/041; G06F 3/0488; G06F 2203/04806; G06F 2203/04808

USPC .................................................. 345/173–179
See application file for complete search history.

(56) References Cited

U.S. PATENT DOCUMENTS

| | | | |
|---|---|---|---|
| 8,238,662 B2 | 8/2012 | Banerjee et al. | |
| 2010/0007675 A1 | 1/2010 | Kang et al. | |
| 2010/0313126 A1* | 12/2010 | Jung | ................... G06F 3/04883 715/702 |
| 2012/0019563 A1* | 1/2012 | Misawa | .............. G06F 3/04845 345/661 |
| 2012/0030635 A1* | 2/2012 | Miyazaki | .............. G06F 3/0482 715/863 |

FOREIGN PATENT DOCUMENTS

| | | |
|---|---|---|
| JP | 4307333 | 8/2009 |
| KR | 1020090041784 | 4/2009 |
| KR | 1020100006003 | 1/2010 |
| KR | 100952306 | 4/2010 |
| KR | 1020100051648 | 5/2010 |
| KR | 1020110042635 | 4/2011 |
| KR | 1020110085193 | 7/2011 |

* cited by examiner

*Primary Examiner* — Amare Mengistu
*Assistant Examiner* — Jennifer Zubajlo
(74) *Attorney, Agent, or Firm* — The Farrell Law Firm, P.C.

(57) ABSTRACT

An image editing apparatus and an image editing method for selecting an area of interest, in which a user more accurately selects an area desired to be selected using a finger by setting a position of a touch input as a selection start point for starting image selection if the user performs the touch input on a background image at the time of image editing, sets a trace generated by moving the background image or the selects start point as a selection image area, and selecting the set selection image area from the background image.

19 Claims, 8 Drawing Sheets
(1 of 8 Drawing Sheet(s) Filed in Color)

IMAGE EDITING APPARATUS AND METHOD FOR SELECTING AREA OF INTEREST

PRIORITY

This application claims priority under 35 U.S.C. §119(a) to Korean Patent Application Serial No. 10-2012-0023909, which was filed in the Korean Intellectual Property Office on Mar. 8, 2012, the entire disclosure of which is incorporated herein by reference.

BACKGROUND OF THE INVENTION

1. Field of the Invention

The present invention relates generally to an image editing apparatus and an image editing method, and specifically, to an image editing apparatus and an image editing method for accurately selecting a desired area of interest to edit in an image.

2. Description of the Related Art

Generally, an image editing tool used in a Personal Computer (PC) provides an image selection tool for selecting an image area desired by a user, using an input apparatus such as a mouse.

Specifically, the image editing tool performs image editing by selecting a border line of an image to be selected from a background image with a pointing device such as a mouse, by a user through a selection tool for selecting an image, setting an image area for selection along the selected border line, and using the set image area for selection.

In addition, a user equipment with a touch panel provides selection of an image area desired, where the selection corresponds to a trace drawn through a touch input by a user's finger in a background image displayed on a touch panel and performs image editing using the selected image area.

As described above, a conventional user equipment with a touch panel performs image editing by setting a trace drawn through a touch input by a user's finger as an image area for selection and using the set image area.

However, when an image area is selected by a finger on a touch panel, since a user's view of the image is obstructed by the position, a shape and a size of the finger, it is inconvenient for a user to clearly recognize an image to be selected.

In addition, since a user may not accurately see the image part obstructed by the finger, it is difficult to correctly position the touch input and move the finger in an intended direction.

SUMMARY OF THE INVENTION

Accordingly, an aspect of the present invention is to solve the above-mentioned problems occurring in the prior art, and to provide at least the advantages below.

An aspect of the present invention, is to provide an image editing apparatus and an image editing method for accurately selecting the desired area of interest when performing image editing through a touch screen.

According to an aspect of the present invention, an image editing apparatus is provided for selecting an area of interest. The image editing apparatus includes a touch screen display for displaying at least one image and receiving an input of a touch or a drag; and a controller generating and displaying, when a first touch is input through the touch screen, a selection start point for starting a selection of a partial area of the image at a position on which the first touch is input, generating, when a second touch and drag is input, a selection trace for selection according to a selection start point corresponding to a trace drawn along the input of the drag by moving the displayed image corresponding to a direction of the input of the drag, and generating a selection image area corresponding to the generated selection trace.

In accordance with another aspect of the present invention, a method for selecting an area of interest in an image editing apparatus is provided. The method includes displaying at least one image and generating and displaying, when a first touch is input, a selection start point for starting a selection of a partial area of the image at a position on which the first touch is input; generating, when a second touch and drag is input, a selection trace for selection according to a selection start point corresponding to a trace drawn along the input of the drag by moving the displayed image corresponding to a direction of the input of the drag; and generating a selection image area corresponding to the generated selection trace.

In accordance with another aspect of the present invention, an image editing apparatus for selecting an area of interest is provided. The image editing apparatus includes a touch screen display for displaying at least one image and receiving an input of a touch or a drag; and a controller generating and displaying, when a first touch is input through the touch screen, a selection start point for starting a selection of a partial area of the image at a position on which the first touch is input, displaying, when a second touch and drag is input, a selection guide line according to a selection start point, moving the selection start point and the selection guide line corresponding to a direction of the input of the drag and generating a selection trace drawn along a movement path of the selection start point, and generating a selection image area corresponding to the generated selection trace.

In accordance with another aspect of the present invention, a method for selecting an area of interest in an image editing apparatus is provided. The method includes displaying at least one image and generating and displaying, when a first touch is input, a selection start point for starting a selection of a partial area of the image at a position on which the first touch is input; displaying, when a second touch and drag is input, a selection guide line according to a selection start point; moving the selection start point and the selection guide line corresponding to a direction of the input of the drag and generating a selection trace drawn along a movement path of the selection start point; and generating a selection image area corresponding to the generated selection trace.

BRIEF DESCRIPTION OF THE DRAWINGS

The above and other aspects, features, and advantages of the present invention will be more apparent from the following detailed description taken in conjunction with the accompanying drawings, in which.

The patent or application file contains at least one drawing executed in color. Copies of this patent or patent application publication with color drawing(s) will be provided by the Office upon request and payment of the necessary fee.

DETAILED DESCRIPTION OF EMBODIMENTS OF THE PRESENT INVENTION

Hereinafter, various embodiments of the present invention are described with reference to the accompanying drawings. In the description and the accompanying drawings, a detailed description of known functions and configurations incorporated herein are omitted to avoid obscuring the subject matter of the present invention.

In accordance with an embodiment of the present invention, a user can accurately select an area desired to be selected using a finger by setting a position of a touch input as a selection start point for starting an image selection if the user performs the touch input on a background image at the time of image editing, setting a trace generated by moving the background image or the selection start point as a selection image area, and selecting the set selection image area from the background image.

Figure 1:
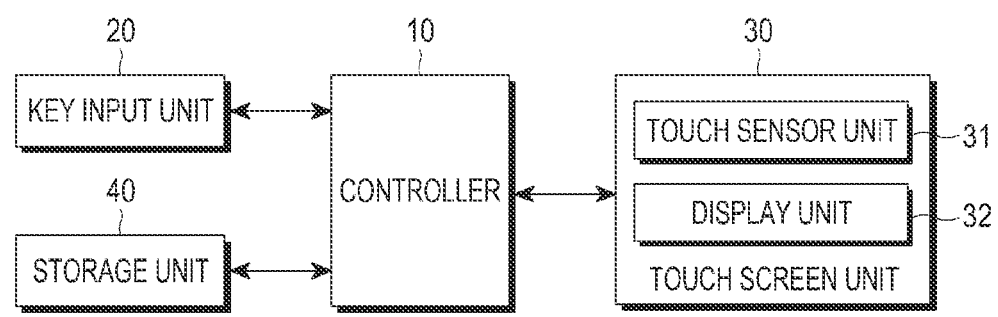
FIG. 1 is a diagram illustrating a configuration of an image editing apparatus, with a touch screen, according to an embodiment of the present invention.

FIG. 1 is a diagram illustrating an image editing apparatus with a touch screen according to an embodiment of the present invention.

The image editing apparatus of FIG. 1 includes a controller 10, a key input 20, a touch screen display 30 with a touch sensor 31 and a display 32, and a storage unit 40.

First, the controller 10 controls overall operations of the image editing apparatus. Specifically, the controller 10 configures an editing screen for editing an image when receiving a request for image editing from the key input 20 or the touch screen display 30, and displays the configured editing screen on the display 32.

The controller 10 displays a background image selected for image editing on the display 32.

When receiving a request for activating an image editing function, the controller 10 activates an image editing function. Here, "activating an image editing function" refers to receiving a touch input or a drag input received through the touch sensor 31 as an input for editing an image.

Here, the controller 10 includes a key for activating an image editing function, and regards the reception of an input signal from the corresponding key as a request for activating an image editing function. In addition, when an input signal corresponding to a touch input is received from the touch sensor 31 on a specific position or an area predetermined for an image editing function, the controller 10 may regard the input signal as a request for activating an image editing function.

When a first touch input is detected through the touch sensor 31, the controller 10 sets the detected first touch input as a selection start point for starting selection according to a partial area of the image, and displays the set selection point at a position of the first touch input through the display 32. Here, the selection start point may be fixed or moved, and indicates a position where an image selection starts.

According to an aspect of the present invention, a position for displaying a background image is changed along the touch input with the selection start point fixed and setting a trace drawn corresponding to the touch input as an image area and a second embodiment of setting a trace drawn with the selection start point moving as a selection image area.

According to an embodiment, if a second touch and drag is detected through the touch sensor 31, the controller 10 changes and displays a display area of the background image which is displayed through the display 32 corresponding to a direction of the detected drag. In other words, the background image displayed on the display 32 may be moved to a direction corresponding to the direction of the detected drag or a direction opposite to the direction of the drag. At this point, the selection start point is displayed with a relative position on the background image changed.

Afterwards, the controller 10 draws and generates a selection trace according to the selection start point corresponding to the trace drawn according to the second touch input along the direction of the detected drag. Here, the generated selection trace means an area of interest which a user desires to select.

The controller 10 generates a selection image area corresponding to the generated selection trace, and performs image editing using the generated selection image area. Here, "image editing" means deleting the selection image area from the background image, or performing an edit function such as deleting, moving, copying, or cropping. In addition the image corresponding to the selection image area copied from the background image may be moved to another background image or a new background image.

According to another embodiment, if a second touch and drag for retouching a position of the selection start point is input through the touch sensor unit 31, the controller 10 displays a selection guide line corresponding to a direction of the drag input from the selection start point between a position of the selection start point and a position of the touch input.

Thereafter, the controller 10 generates a selection trace which is drawn along the position of the selection start point which moves corresponding to the direction of the drag input. At this point, the selection guide line is displayed in a manner of moving together with the selection start point in the direction of the drag with a certain distance from the selection start point.

The controller 10 generates a selection image area corresponding to the generated selection trace and performs image editing using the generated selection image area.

However, since a finger of a person is very sensitive, a selection trace drawn along the direction of the drag is not smooth and it is not easy to accurately select the image area desired to be selected by the user using a finger. Therefore, the present invention provides a method for guiding a user to a direction of a drag for a selection and accurately selecting an image desired to be selected along a beautified selection trace.

When generating a selection trace, in order to beautify a selection trace, the controller 10 sets and displays an enhancement reference area corresponding to the selection start point. Here, the enhancement reference area means an area configured by a plurality of reference areas in order to beautify the selection trace drawn along a drag input. For example, the enhancement reference area may be configured by a circle including 8 reference areas with the selection start point as a center. In addition, the enhancement reference area has a predetermined enhancement selection trace corresponding to each of the reference areas.

Hereinafter, the controller 10 determines in which reference area among the predetermined enhancement reference area the displayed selection guide line is included and displays the predetermined enhancement selection trace corresponding to the determined reference area.

When displaying the enhancement trace, in order to guide a user to a direction of a touch input or a drag for selection and at the same time to generate a correct selection trace, the controller 10 applies an edge weight filter corresponding to the direction of the drag detected in the image area with a predetermined size according to the selection start point in the background image.

The controller 10 determines a direction having edge components most in an image area on which the edge weight filter is applied and displays a predetermined enhancement selection trace in the determined direction.

Then, the controller 10 generates a selection image area corresponding to the displayed enhancement trace, and selects the generated selection image area from the background image.

The key input 20 receives an input of a key operation signal of a user for controlling an image editing apparatus to the controller 10. The key input 20 may include a number key and an arrow key. According to an embodiment of the present invention, if all the operations are performed only with the touch screen display 30, the key input 20 may not be provided.

The touch screen display 30 includes the touch sensor 31 and the display 32, and the touch sensor 31 detects a touch input of a user, generates a detection signal, and transmits the generated detection signal to the controller 10. The touch sensor 31 may be configured by a touch sensor such as capacitive overlay, resistive overlay, and infrared beam, or configured by a pressure sensor. The touch sensor 31 is not limited thereto, and may be all kinds of sensors that can sense a contact or a pressure of an object.

The display 32 is implemented as a with a Liquid Crystal Display (LCD), and provides a user with a menu, input data, function set information, and various kinds of information of the portable terminal. For example, the display 32 performs a function of outputting a booting screen, a standby screen, a display screen, a communication screen, and another application execution screen of a portable terminal.

The storage 40 performs a function of storing a program or data required for an operation of an image editing apparatus. Specifically, the storage 40 stores at least one background image, an enhancement reference area, at least one edge weight filter, and the like.

According to an aspect of the present invention, an area of interest is selected, in which a user is interested in the background image.

Figure 2:
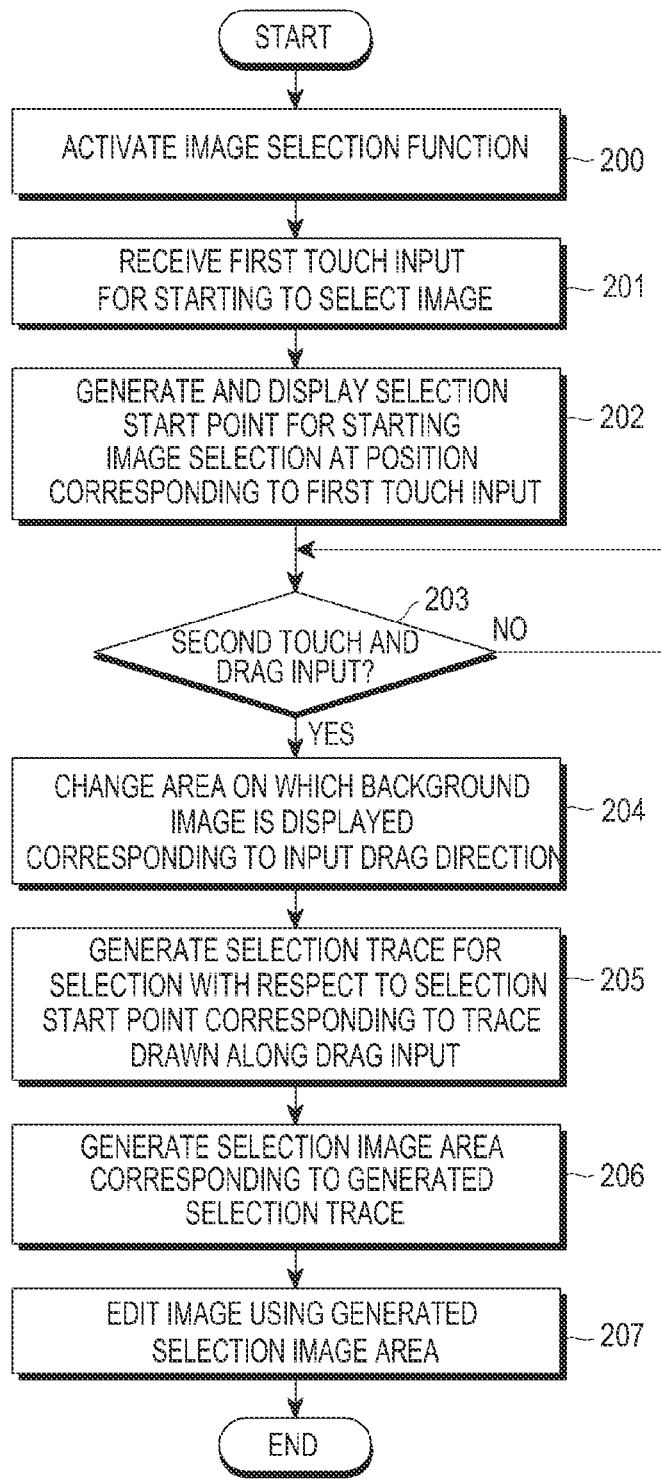
FIG. 2 is a flowchart illustrating a process for selecting a specific image area by an image editing apparatus according to an embodiment of the present invention.

FIG. 2 is a flowchart illustrating a process for selecting a specific image area by an image editing apparatus according to an embodiment of the present invention.

In Step 200, if a request for activating an image editing function is received, the controller 10 activates an image editing function.

In Step 201, the controller 10 receives a first touch input for starting image selection by the touch screen display 30.

In Step 202, the controller 10 generates and displays a selection start point for starting image selection at a position corresponding to the received first touch input. In other words, the controller 10 sets the received first touch input as a selection start point for starting a selection of a partial area of an image and displays the set selection start point at a position of the first touch input through the display 32.

In Step 203, the controller 10 determines whether or not the second touch and drag is input through the touch screen display 30. The controller 10 proceeds to Step 204 if the second touch and drag is input, or continuously determines whether or not the second touch and drag is input if the second touch and drag is not input in Step 203.

In Step 204, the controller 10 changes an area on which a background image is displayed corresponding to a direction of the input drag. That is, the controller 10 changes a display area on which a background image is displayed through the display 32 corresponding to the direction of the input drag.

In Step 205, the controller 10 generates a selection trace for selecting according to a selection start point corresponding to a trace drawn along the drag input. In other words, the controller 10 draws and generates a selection trace according to a selection start point corresponding to a trace drawn along a direction of a drag.

In Step 206, the controller 10 generates a selection image area corresponding to the generated selection trace, and performs image editing using the generated selection image area in Step 207.

As described above, aspects of the present invention enable a user to accurately select an area of interest in which in a background image the user is interested.

Figure 3:
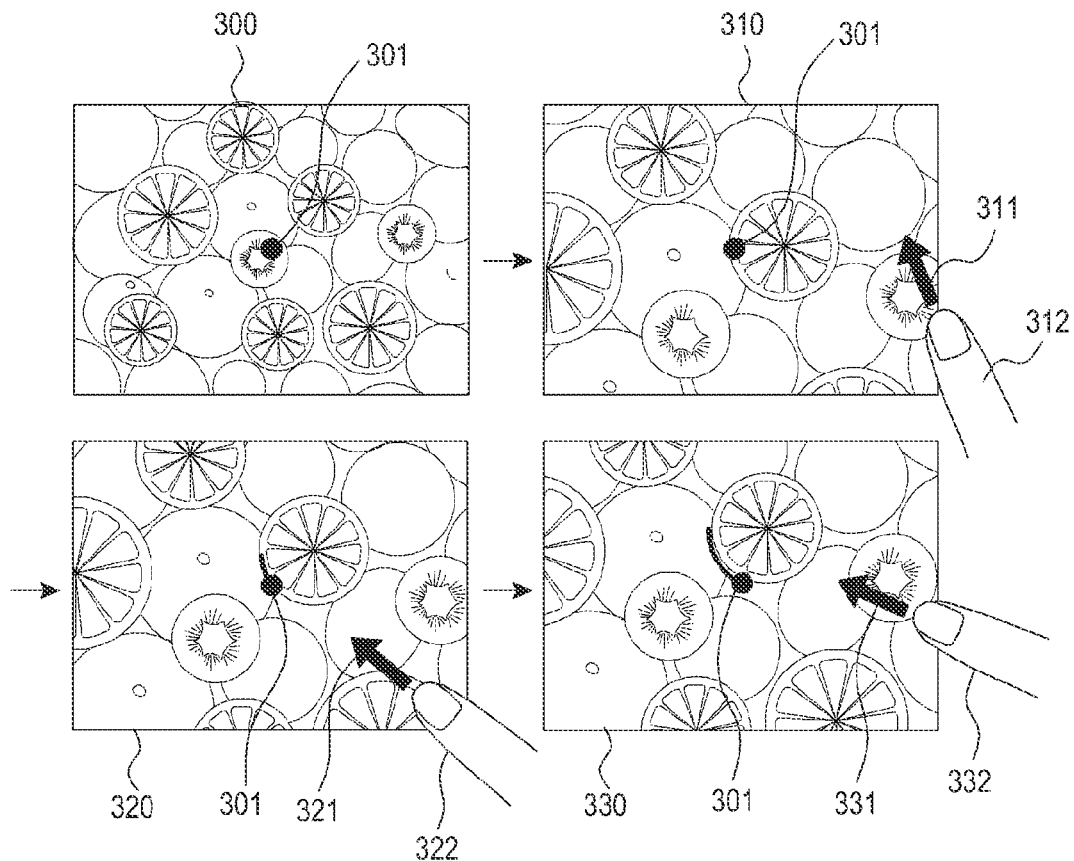
FIG. 3 is a drawing illustrating an example of a process for selecting a specific image area according to an embodiment of the present invention.

FIG. 3 is a drawing illustrating an example of a process for selecting a specific image area according to an embodiment of the present invention.

As illustrated in an image indicated by reference numeral 300, according to a request for activating an image editing function, if a touch is input at a position indicated by reference numeral 301, the controller 10 activates an image editing function and displays a selection start point 301.

At this point, if the displayed selection start point 301 is not positioned on an outline of an object in a background image, a user moves a position of the selected background image or enlarges the background image so that the selection start point 301 in an image indicated by reference numeral 310 is positioned on the outline of the object to be selected in the background image.

As indicated by the reference numeral 310, if an input for enlarging the background image in order to position the selection start point on the outline of the specific object which is desired to be selected by the user exists, the controller 10 enlarges the background image so that the selection start point 301 is positioned on the outline of the object to be selected in the background image. At this point, the selection start point 301 is positioned on the outline of the object to be selected by the user.

Thereafter, if a touch and drag input 312 exists in a direction indicated by reference numeral 311, the controller 10 changes a position of an area on which the background image is displayed corresponding to the trace drawn by the touch and drag input 312.

As indicated by reference numeral 320, if a second touch and drag input 322 for image selection in a direction indicated by reference numeral 321 exists, the controller 10 changes an area on which the background image is displayed corresponding to a trace drawn along the second touch and drag input 322 and draws and generates a selection trace according to the selection start point.

As indicated by a reference numeral 330, if a drag input 332 exists in a direction indicated by reference numeral 331, the controller 10 changes an area on which the background image is displayed corresponding to a trace drawn along a drag input, and draws and generates a selection trace according to the selection start point. At this time, the selection trace is drawn along the line of an image area desired to be selected.

In this manner, the present invention enables a user to accurately select an area of interest in which the user is interested in the background image.

Figure 4:
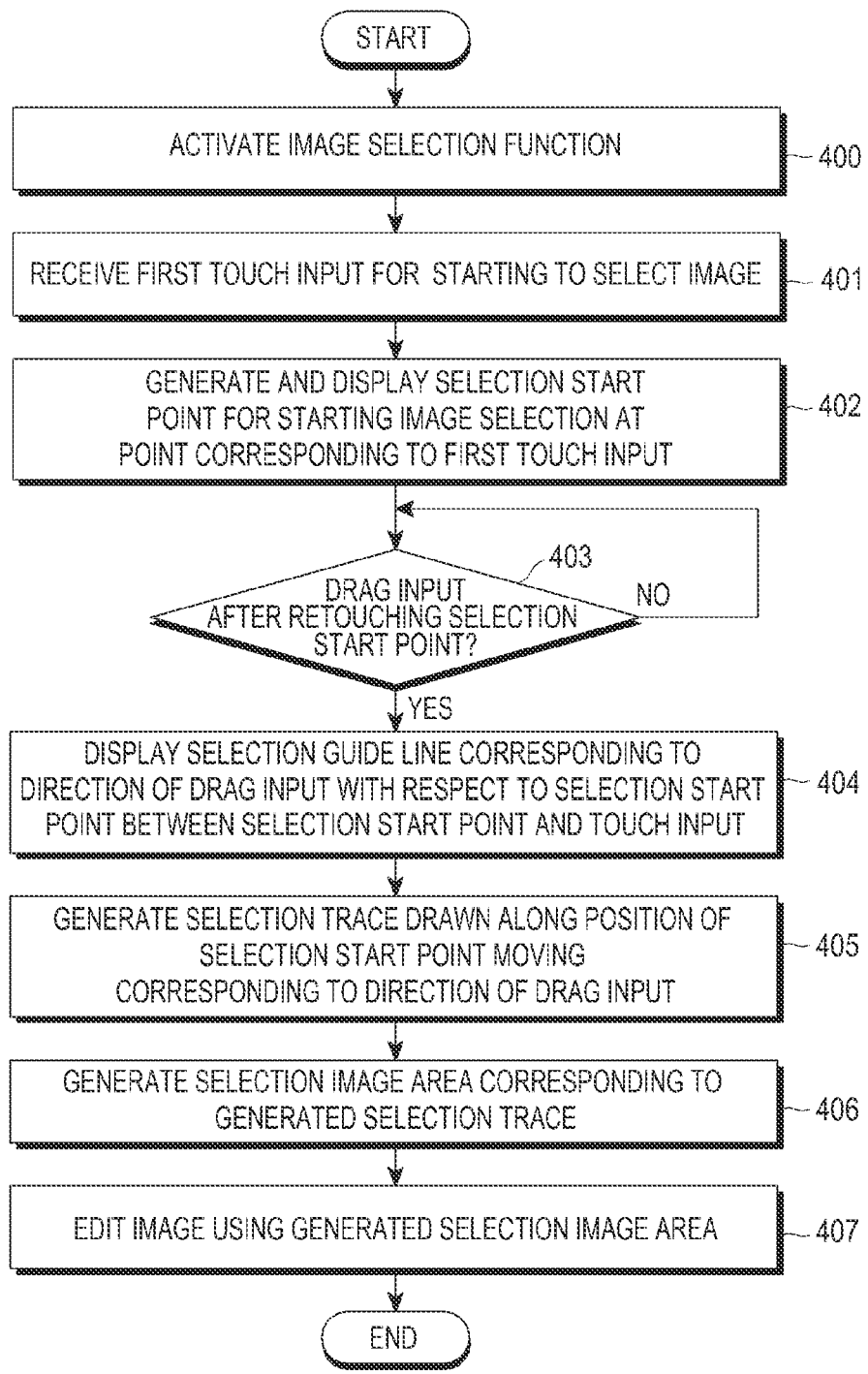
FIG. 4 is a flowchart illustrating a process for selecting a specific image area in an image editing apparatus according to an embodiment of the present invention.

FIG. 4 is a flowchart illustrating a process for selecting a specific image area in an image editing apparatus according to an embodiment of the present invention.

In Step 400, if the controller 10 receives a request for activating an image editing function, the controller 10 activates an image editing function.

In Step 401, the controller 10 receives a first touch input for starting image selection through the touch screen display 30.

In Step 402, the controller 10 generates and displays a selection start point for starting image selection at a position corresponding to the received first touch input. In other words, the controller 10 sets a first touch input as a selection start point for starting a selection of a partial area of an image, and displays the set selection start point at a position of the first touch input through the display 32.

In Step 403, the controller 10 determines whether an input of the second touch and drag in which retouching and dragging the selection start point is input through the touch screen display 30 exists or not. The controller 10 proceeds to Step 404 if an input exists, or the controller 10 continuously determines whether an input of the second touch and drag exists or not in Step 403 if an input does not exist.

In Step 404, the controller 10 displays a selection guide line corresponding to a direction of a drag input according to the selection start point between the selection start point and the touch input.

In Step 405, the controller 10 generates a selection trace drawn along a point of the selection start point moving corresponding to the direction of the drag input. At this point, the selection guide line is displayed in a manner of moving together with the selection start point with a certain distance from the selection start point corresponding to the direction of the drag input.

In Step 406, the controller 10 generates a selection image area corresponding to the generated selection trace and performs image editing using the generated selection image area in Step 407.

In this manner, the present invention enables the user to accurately select an area of interest in which the user is interested in the background image.

Figure 5:
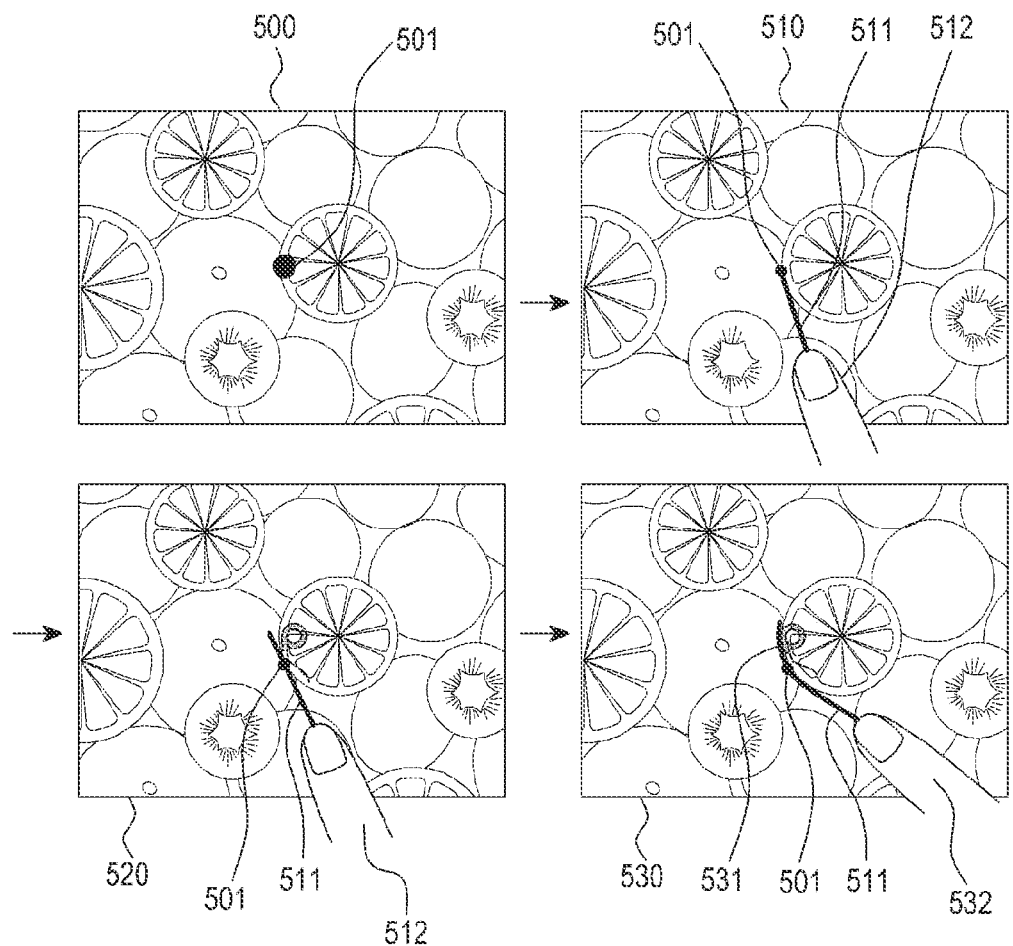
FIG. 5 is a diagram illustrating an example of a process for selecting a specific image area according to an embodiment of the present invention.

FIG. 5 is a diagram illustrating an example of a process for selecting a specific image area according to an embodiment of the present invention.

As indicated by reference numeral 500, if a touch input at a position indicated by reference numeral 501 according to a request for activating an image editing function exists, the controller activates the image editing function and displays a selection start point 501.

As indicated by reference numeral 510, if an input 512 of a second touch and drag for retouching and dragging the selection start point exists, the controller 10 displays a selection guide line 511 corresponding to a direction of a drag input according to the selection start point between the position 501 of the selection start point and the position 512 of the touch input.

As indicated by reference numeral 520, the controller 10 generates a selection trace drawn along the position 501 of the selection start point moving corresponding to the direction of the drag input. At this point, the selection guide line 511 is displayed in a manner of moving together with the selection start point with a certain distance from the selection start point corresponding to the direction of the drag input.

As indicated by reference numeral 520, a drag input direction 532 is input in a changed manner, the controller 10 continuously generates a selection trace 531 drawn corresponding to a direction of a drag input moving in a changed manner.

In this manner, the present invention enables the user to accurately select an area of interest in which the user is interested in the background image.

Figure 6:
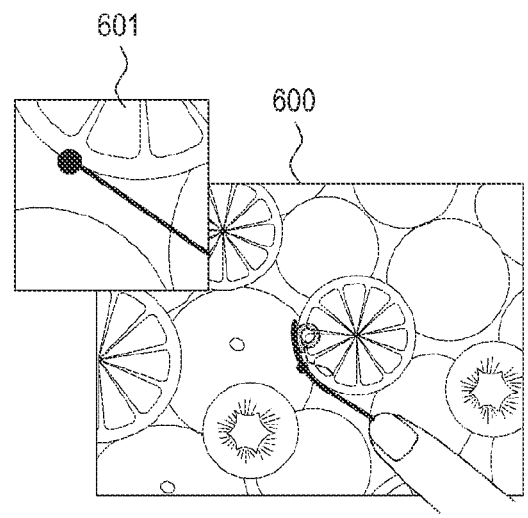
FIG. 6 is a diagram illustrating an example of a process for displaying the selection trace in an enlarged manner according to an embodiment of the present invention.

FIG. 6 is a diagram illustrating an example of a process for displaying the selection trace in an enlarged manner according to an embodiment of the present invention.

As illustrated in FIG. 6, in the background image as illustrated in an image indicated by reference numeral 600, the controller 10 may enlarge and display an image area in which a selection trace is drawn as illustrated in an image indicated by reference numeral 601. Accordingly, the user may easily perform a touch and drag input by more accurately checking a selection trace drawn along the direction of the drag input.

Figure 7:
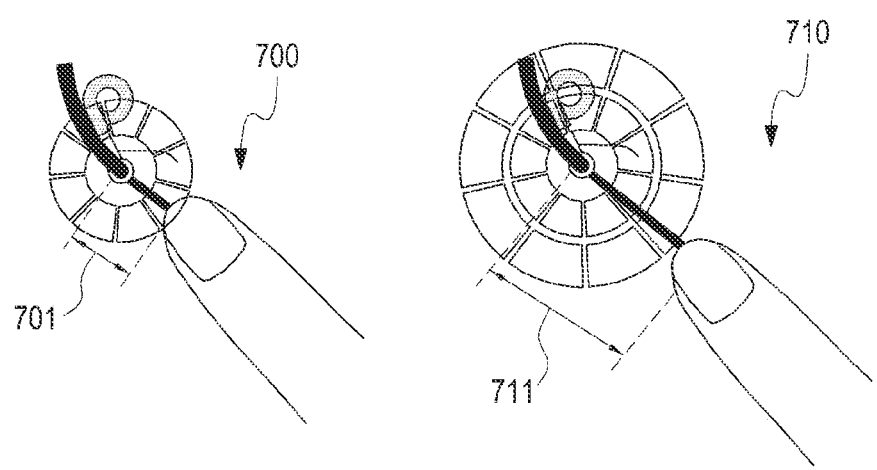
FIG. 7 is a diagram illustrating an example of a process of converting a moving speed of a selection trace according to a length of a selection guide line according to an embodiment of the present invention.

FIG. 7 is a diagram illustrating an example of a process of converting a moving speed of a selection trace according to a length of a selection guide line according to an embodiment of the present invention.

In the present invention, a speed of drawing the selection trace according to a predetermined moving speed according to the length of the selection guide line of the present invention is adjusted.

As indicated by reference numeral 700, when a selection trace is drawn in a length of a selection guide line as indicated by reference numeral 701 corresponding to a touch and drag input, the controller 10 may generate a selection trace moving a selection start point in a predetermined moving speed corresponding to the length as indicated by reference numeral 701.

In addition, as indicated by reference numeral 710, when a selection trace is drawn in a length of a selection guide line as indicated by reference numeral 711 corresponding to a touch and drag input, the controller 10 may generate a selection trace moving a selection start point in a predetermined moving speed corresponding to the length as indicated by reference numeral 711. At this time, since the length as indicated by reference numeral 711 is longer than the length as indicated by reference numeral 701, a predetermined speed corresponding to the length as indicated by reference numeral 711 may be set to be faster than the predetermined speed corresponding to the length as indicated by reference numeral 701.

Figure 8:
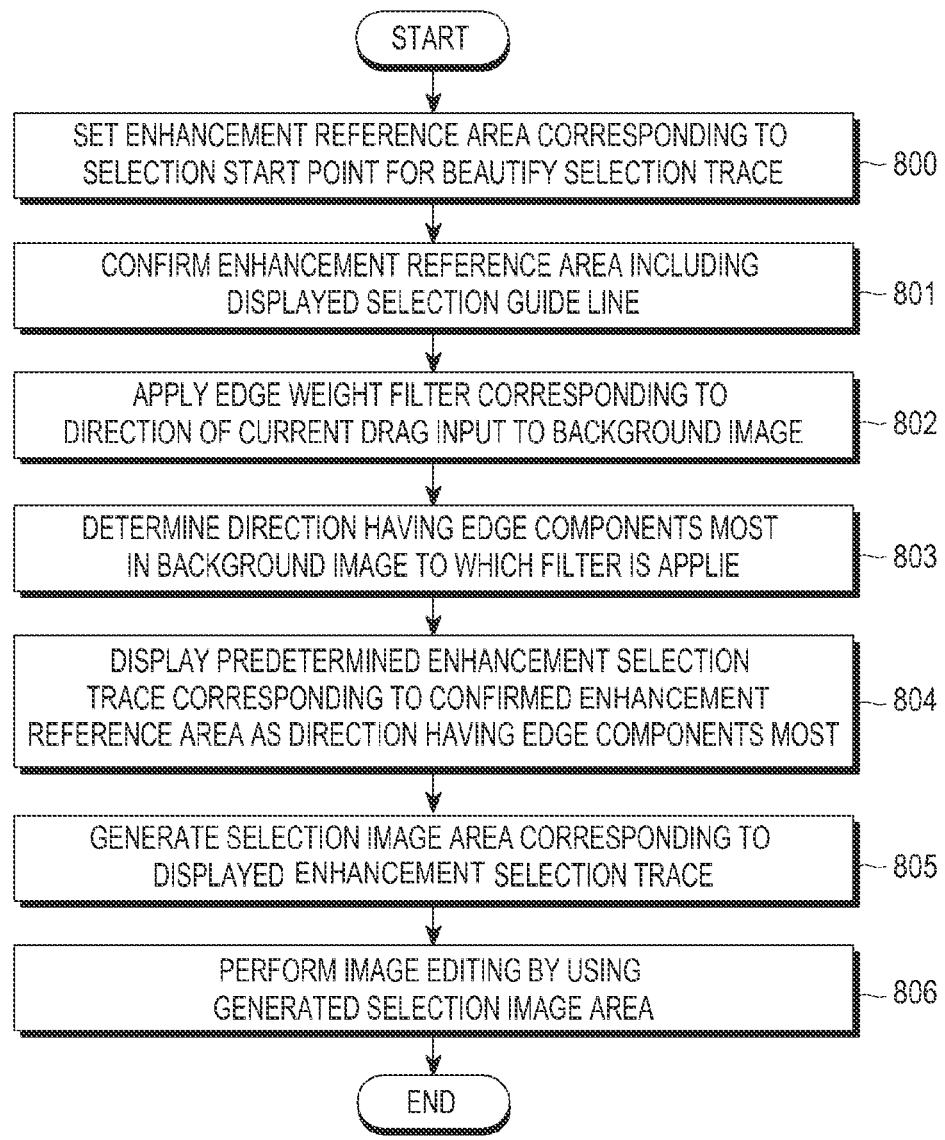
FIG. 8 is a flowchart illustrating a process for setting a selection image area corresponding to an enhancement selection trace according to an embodiment of the present invention.

FIG. 8 is a flowchart illustrating a process for setting a selection image area corresponding to an enhancement selection trace according to an embodiment of the present invention.

In Step 800, the controller 10 sets an enhancement reference area corresponding to a selection start point in order to beautify a selection trace. At this point, the enhancement reference area refers to an area including a plurality of reference areas in order to beautify the selection trace drawn according to a drag input.

In Step 801, the controller 10 confirms an enhancement reference area including a selection guide line.

In Step 802, the controller 10 applies an edge weight filter corresponding to a direction of the current drag input to a background image displayed on the display 32. Specifically, the controller 10 applies an edge weight filter corresponding to a direction of the current drag input to an image area in a predetermined size according to the selection start point. At this point, the edge weight filter includes a horizontal direction weight filter and a vertical direction weight filter. In addition, the controller 10 may use a kirsch filter mask as an edge weight filter.

In Step 803, the controller 10 determines a direction having edge components most in a background image on which a filter is applied. Specifically, the controller 10 determines edge components on an image near the selection start point according to the current selection start point, and then determines the direction having edge components most.

In Step 804, the controller 10 displays a predetermined enhancement selection trace corresponding to the enhancement reference area confirmed in Step 801 described above as a direction having edge components most. Here, the enhancement reference area includes display information according to the predetermined enhancement selection trace for each reference area.

In Step 805, the controller 10 generates a selection image area corresponding to the displayed enhancement selection trace, and performs image editing by using the selection image area generated in Step 806.

In this manner, the present invention enables the user to accurately select an area of interest in which the user is interested in the background image.

Figure 9:
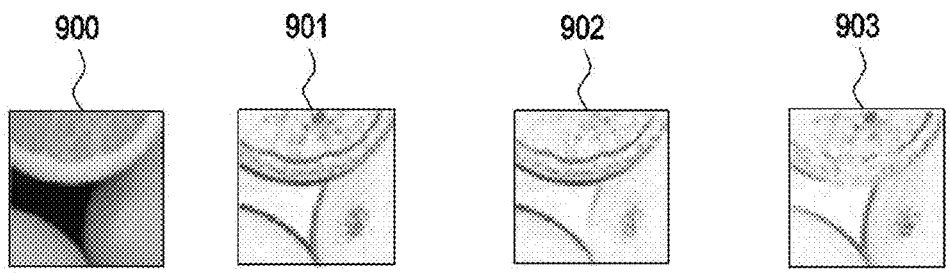
FIGS. 9 to 10 are diagrams illustrating examples of processes for setting a selection image area corresponding to the enhancement selection trace according to an embodiment of the present invention.
Figure 10:
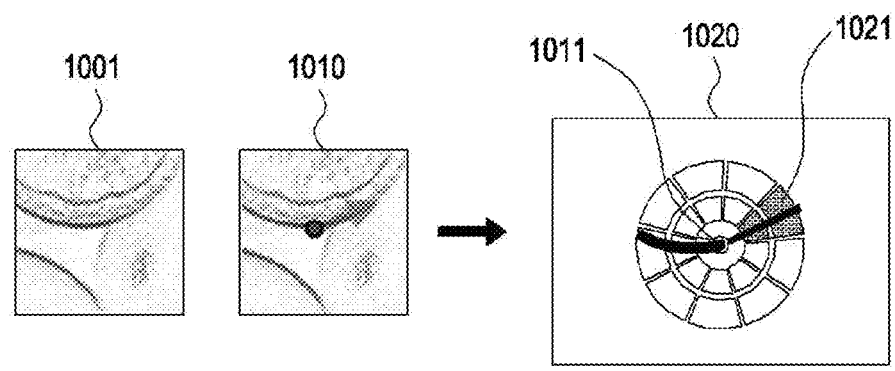

FIGS. 9 to 10 are diagrams illustrating examples of processes for setting a selection image area corresponding to the enhancement selection trace according to an embodiment of the present invention.

A process for applying an edge weight filter corresponding to a current drag direction on the displayed background image with reference to FIGS. 9 to 10 is described in detail as follows.

The controller 10 applies an edge weight filter corresponding to the current drag input to an image area 900 in a predetermined size according to the selection start point as illustrated in FIG. 9. At this point, the image area on which a filter is applied may be shown as an image as indicated by reference numeral 901. In addition, reference numeral 902 indicates an image area on which a horizontal weight filter is applied and reference numeral 903 indicates an image area on which a vertical weight filter is applied.

As indicated by reference numeral 1001 in FIG. 10, in an image area on which an edge weight filter is applied, the controller 10 determines a direction having edge components most as shown in an image indicated by reference numeral 1010, and draws and displays a selection start point 1011 by moving the selection start point 1011 in a determined direction 1012.

In addition, the controller 10 may guide a user to a direction to move by displaying a beautified selection trace 1021 according to a selection start point 1011 as indicated by reference numeral 1020 and displaying a reference area corresponding to a determined direction in a predetermined selection reference area, with a specific color.

The present invention has an advantage in that in an image editing apparatus including a touch screen, a user may more accurately select an area of interest on an image.

While the present invention has been shown and described with reference to various embodiments thereof, it will be understood by those skilled in the art that various changes in form and details may be made therein without departing from the spirit and scope of the present invention as defined by the appended claims.

What is claimed is:

1. An electronic device for selecting an area of interest, the electronic device comprising:
  a display configured to display an image; and
  a controller configured to:
  if a touch input is received, control the display to display a selection start point at a position on which the touch input is inputted from a user, wherein the selection start point is fixed on the display,
  if a drag input is received, generate a trace of the selection start point drawn on the image along a movement of the image according to the drag input, wherein the trace of the selection start point is drawn on the image in an opposite direction of the movement of the image,
  control the display to display the trace of the selection start point on the image, and
  determine an area of the image corresponding to the trace of the selection start point, as a selection area.

2. The electronic device of claim 1, wherein the controller is further configured to perform image editing using the selection area, and the image editing includes at least one of moving, copying, deleting, and cropping the selection area.

3. The electronic device of claim 1, wherein the image is moving in a direction corresponding to a direction of the drag input or an opposite direction of the drag input.

4. The electronic device of claim 1, wherein the controller is further configured to:
  control the display to display a selection guide line with the selection start point, and move the selection guide line according to the drag input.

5. The electronic device of claim 4, wherein the selection guide line is displayed in a predetermined length between the selection start point and the drag input.

6. The electronic device of claim 4, wherein a speed of the trace of the selection start point drawn along the drag input is adjusted corresponding to the length of the selection guide line.

7. The electronic device of claim 4, wherein the controller is further configured to:
  set an enhancement reference area including at least one reference area, from the selection start point, determine a reference area including the selection guide line in the enhancement reference area, and control the display to display the a trace of the reference area as an enhancement selection trace.

8. The electronic device of claim 7, wherein the controller is further configured to:
  set an image area in a predetermined size from the selection start point in the displayed image, apply an edge weight filter corresponding to a direction of the drag input to the image area, determine a direction having edge components most in the image area on which the filter is applied, and control the display to display the enhancement selection trace in the determined direction.

9. The electronic device of claim 1, wherein the controller is further configured to generate the selection start point if the touch input is received through the display.

10. The electronic device of claim 1, wherein, the image is moving on the display according to the drag input, and the trace of the selection start point is a path of the selection starting point generated on the image by moving of the image.

11. A method for selecting an area of interest at an electronic device, the method comprises:
    displaying an image by a display of the electronic device;
    if a touch input is received, displaying a selection start point at a position on which the touch input is inputted from a user, wherein the selection start point is fixed on the display;
    if a drag input is received, generating a trace of the selection start point drawn on the image along a movement of the image according to the drag input, wherein the trace of the selection start point is drawn on the image in an opposite direction of the movement of the image;
    displaying the trace of the selection start point on the image; and
    determining an area of the image corresponding to the trace of the selection start point, as a selection area.

12. The method of claim 11, further comprising:
    performing image editing using the selection area,
    wherein the image editing includes at least one of moving, copying, deleting, and cropping the selection area.

13. The method of claim 11, wherein the image is moving in a direction corresponding to a direction of the drag input or an opposite direction of the drag input.

14. The method of claim 11, further comprising:
    displaying a selection guide line with the selection start point and;
    moving the selection guide line according to the drag input.

15. The method of claim 14, wherein the selection guide line is displayed in a predetermined length between the selection start point and the drag input.

16. The method of claim 15, wherein a speed of the trace of the selection start point drawn along the drag input is adjusted corresponding to the length of the selection guide line.

17. The method of claim 14, further comprising:
    setting an enhancement reference area including at least one reference area, from the selection start point;
    determining a reference area including the selection guide line in the enhancement reference area; and
    displaying a trace of the reference area as an enhancement selection trace.

18. The method of claim 17, wherein displaying the enhancement selection trace comprises:
    setting an image area in a predetermined size from the selection start point in the displayed image,
    applying an edge weight filter corresponding to a direction of the drag input to the set image area, and
    determining a direction having edge components most in the image area on which the filter is applied, and
    displaying the enhancement selection trace in the determined direction.

19. The method of claim 11, wherein, the image is moving on the display according to the drag input, and the trace of the selection start point is a path of the selection starting point generated on the image by moving of the image.

* * * * *